United States Patent
Bao et al.

(10) Patent No.: US 9,411,868 B2
(45) Date of Patent: Aug. 9, 2016

(54) PASSIVE REAL-TIME ORDER STATE REPLICATION AND RECOVERY

(71) Applicant: Morgan Stanley & Co. LLC, New York, NY (US)

(72) Inventors: Daniel Bao, Shanghai (CN); Kevin Elliott, Ipswich (GB); Aaron Hua, Shanghai (CN); Dileep Perchani, West New York, NJ (US); Robert Spinella, New York, NY (US)

(73) Assignee: Morgan Stanley & Co. LLC, New York, NY (US)

( * ) Notice: Subject to any disclaimer, the term of this patent is extended or adjusted under 35 U.S.C. 154(b) by 116 days.

(21) Appl. No.: 13/974,874

(22) Filed: Aug. 23, 2013

(65) Prior Publication Data

US 2015/0058285 A1    Feb. 26, 2015

(51) Int. Cl.
*G06F 17/30* (2006.01)

(52) U.S. Cl.
CPC .... *G06F 17/30575* (2013.01); *G06F 17/30371* (2013.01)

(58) Field of Classification Search
USPC .......................................... 707/610, 634, 674
See application file for complete search history.

(56) References Cited

U.S. PATENT DOCUMENTS

| | | | |
|---|---|---|---|
| 6,937,387 B1 * | 8/2005 | Saint Georges et al. | 359/337.11 |
| 7,472,228 B2 * | 12/2008 | McKenney | G06F 9/526 707/E17.007 |
| 7,873,612 B2 * | 1/2011 | McKenney | G06F 17/30958 707/704 |
| 8,477,600 B2 * | 7/2013 | Yong | H04L 45/00 370/217 |
| 8,522,537 B2 * | 9/2013 | Lee | F01M 5/001 60/298 |
| 2003/0236738 A1 * | 12/2003 | Lange | G06Q 30/08 705/37 |
| 2006/0074993 A1 * | 4/2006 | Pulamarasetti et al. | 707/200 |
| 2006/0129562 A1 * | 6/2006 | Pulamarasetti et al. | 707/10 |
| 2007/0157016 A1 * | 7/2007 | Dayan et al. | 713/2 |
| 2007/0220067 A1 * | 9/2007 | Suriyanarayanan | G06F 17/30174 |
| 2008/0168082 A1 * | 7/2008 | Jin | G06F 8/20 |
| 2008/0240039 A1 * | 10/2008 | Parekh | H04W 36/02 370/331 |
| 2009/0225771 A1 * | 9/2009 | Yasuda | H04L 49/90 370/412 |
| 2011/0072211 A1 * | 3/2011 | Duluk et al. | 711/118 |
| 2011/0072245 A1 * | 3/2011 | Duluk et al. | 712/220 |
| 2011/0218962 A1 * | 9/2011 | Vinay et al. | 707/610 |
| 2012/0137164 A1 * | 5/2012 | Uhlig | G06F 11/004 714/4.11 |
| 2012/0150829 A1 * | 6/2012 | Bourbonnais | G06F 17/30578 707/703 |
| 2013/0085624 A1 * | 4/2013 | Yang et al. | 700/297 |

* cited by examiner

*Primary Examiner* — Hanh Thai
(74) *Attorney, Agent, or Firm* — Weitzman Law Offices, LLC

(57) ABSTRACT

A system and method for passive real-time order state replication and recovery. Upstream data is received from an upstream system via a reliable transport, the upstream data also received by a supported system. Downstream data is received from the supported system via the reliable transport. Data acknowledgements are received from the supported system acknowledging receipt of the upstream and downstream data. A replicated current order state of the supported system is continuously updated in real-time based on the received upstream data, downstream data and the data acknowledgements. A recovery request is received after the supported system has experienced an outage. The current order state is restored to the supported system by transmitting a recovery message to the supported system containing the replicated current order state.

24 Claims, 16 Drawing Sheets

| Scenario | Pending New Message | Pending Replacement Message | Pending Cancellation Message | Phase 1: "New Message" Recoveries | Phase 2: "Pending Message" Recoveries |
|---|---|---|---|---|---|
| 600 | False | False | False | Recover | N/A |
| 605 | False | False | True | Recover | Send Cancellation Acknowledgement |
| 610 | False | True | False | Recover | Attempt replace |
| 615 | False | True | True | Recover | Attempt replacement and cancellation |
| 620 | True | False | False | N/A | Attempt new order |
| 625 | True | False | True | N/A | Attempt new order and cancellation |
| 630 | True | True | False | N/A | Attempt new order and replacement |
| 635 | True | True | True | N/A | Attempt new order, replacement and cancellation |

FIG. 6

PASSIVE REAL-TIME ORDER STATE REPLICATION AND RECOVERY

BACKGROUND

1. Field

This disclosure relates generally to fault detection and recovery, and, more particularly, to a system and method for restoring a database, database record or associated metadata to a desired consistent order state.

2. Background

Performance requirements often demand persistent availability of computing resources. Computing systems designed to meet these demands are called "high-availability" computing systems. High availability systems utilize a number of diverse strategies to operate for long periods of time with a low rate of failure. When failures do occur, systems and strategies may be utilized to maintain the appearance of normal operation to external systems, recover a lost state or lost information, and restore normal operation as quickly as possible.

Traditionally, there are two primary replication and recovery solutions for high-availability computing systems. The first traditional replication and recovery solution relies on internal application logic to maintain persistent order state in memory in case of failure. However, this makes the system highly vulnerable to data corruption. If the host computer system crashes, there may be state and information losses upon recovery, leaving the application in an inconsistent and unpredictable condition. These outages are, of course, inevitable, and Information Technology (IT) personnel must often forego maintaining persistence to undergo time-intensive restoration of the application to a "clean" operating state, risking the loss of critical information.

The second traditional replication and recovery solution relies on active applications that are hosted on separate computer systems, tasked with providing data replication and recovery services. These applications are placed on the data flow path and intercept inbound data before passing it along to the supported computer system. While this solution avoids the pitfalls of relying on internal application logic, it necessarily introduces latency into the system, which may create unacceptable data bottlenecks, especially for systems that must handle large volumes of information. Furthermore, both traditional replication and recovery solutions typically require large amounts of processing time to recover the order state of the supported system.

BRIEF SUMMARY

In one aspect of this disclosure, a system and method for passive real-time order state replication and recovery is disclosed. Upstream data is received from an upstream system via a reliable transport, the upstream data also received by a supported system. Downstream data is received from the supported system via the reliable transport. Data acknowledgements are received from the supported system acknowledging receipt of the upstream and downstream data. A replicated current order state of the supported system is continuously updated in real-time based on the received upstream data, downstream data and the data acknowledgements. A recovery request is received after the supported system has experienced an outage. The current order state is restored to the supported system by transmitting a recovery message to the supported system containing the replicated current order state.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

This disclosure is further described in the detailed description that follows, with reference to the drawings, in which:

FIG. 6 is an illustrative table describing how different types of messages are handled during the recovery process.

DETAILED DESCRIPTION

This application discloses a passive real-time order state replication and recovery system and method, which utilizes a separately hosted application to receive and process out-of-band upstream and downstream data to continuously update in real-time the order state of a supported data or computer system. By keeping the monitoring instances separate from the supported data system, the passive real-time order state replication and recovery system and method avoids the pitfalls of high-availability data systems that rely on internal application logic, in that an outage of the supported data system has no impact on the passive real-time order state replication and recovery system and method. Similarly, by utilizing particular low latency transmission protocols that are separate from the main data path to disseminate data, minimal latency is introduced to the system.

Moreover, instead of iterating through the historical sequence of inputs and outputs to restore application state, the passive real-time order state replication and recovery system continually maintains, in real-time, the same "order state" as the supported system. There are many different order states, examples of which include (but are not limited to) initial, acknowledgment, order is being processed, fill or kill, immediate, canceled, good for day, and closed. When the supported system experiences an outage, the preserved order state information is applied to the supported system to restore the order state of the supported system, minimizing the unavailability of the supported system due to the outage.

Figure 1:
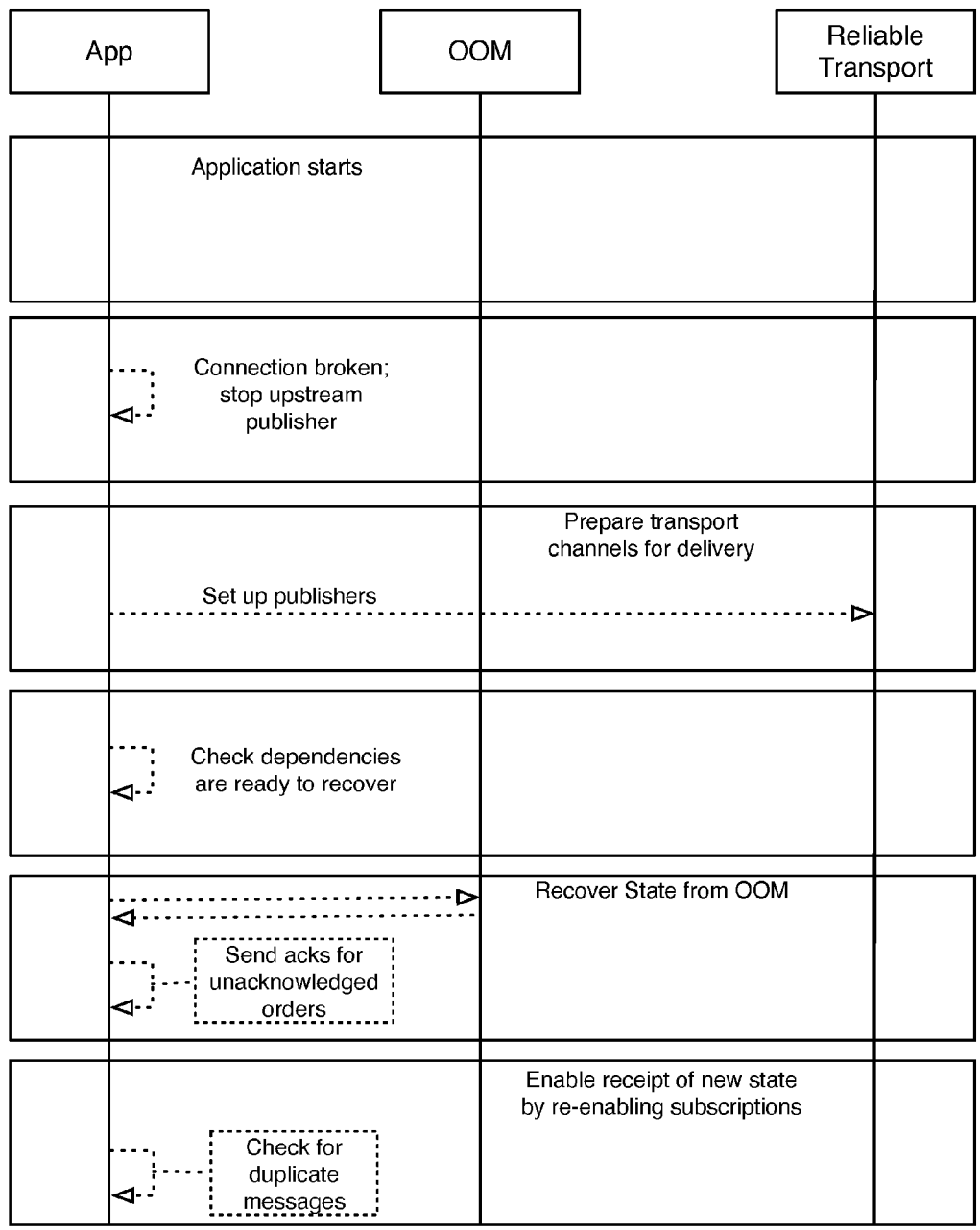
FIG. 1 is a high level representation of an illustrative passive real-time order state replication and recovery system providing support for a supported data system.

FIG. 1 is a high level representation of an illustrative passive real-time order state replication and recovery system and method providing support for a supported data system. The diagram illustrates the general operation of the entire system and method, and is described in detail through FIGS. 1A-1F.

Figure 1A:
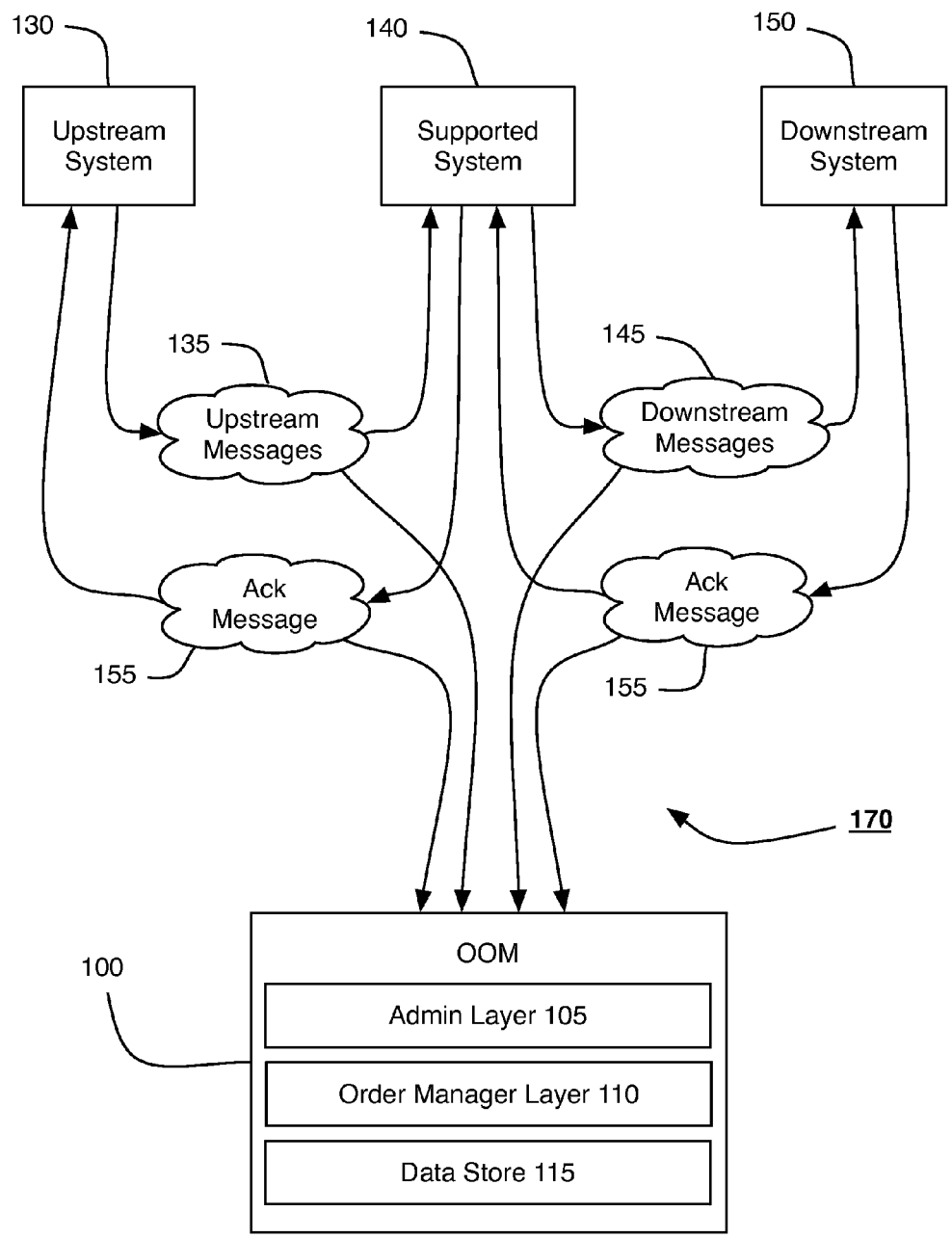
FIGS. 1A-1F are high level representations of an illustrative passive real-time order state replication and recovery system providing support for a supported data system.

FIGS. 1A-1F are high level representations of an illustrative passive real-time order state replication and recovery system ("OOM") 100. FIG. 1A illustrates OOM 100 during normal operation. OOM 100 provides replication and recovery support for a supported computer system 140, which may be any type of computer system that processes orders and has stateful transactions. By way of example, the supported computer system 140 may be a trading engine or component in a trading network that receives orders, breaks up the received orders into multiple orders, and places the multiple orders onto multiple venues. Supported system 140 is tasked with receiving upstream message data 135 from an upstream server system 130 and transmitting downstream message data 145 to a downstream server system 150. The upstream server system 130 may be, for example, an entry system, order router or a component that delivers an order to the supported system 140. Similarly, the downstream server system 150 may be, for example, another trading engine or an exchange gateway that receives and delivers orders to multiple exchanges.

The upstream and downstream messages 135, 145 may be transmitted via a reliable transport 170. The reliable transport 170 may be, for example, a topic-oriented data publication service, wherein systems subscribe to particular "topics" and receive only messages from the reliable transport 170 pertaining to the subscribed topic. Once an upstream message 135 is received by the supported system 140, the received message 135 is processed by the supported system 140. Upon successful processing of the upstream message 135, the supported system 140 may send an acknowledgement 155 to the upstream server system 130 via reliable transport 170.

OOM 100 supports the supported system 140 by receiving upstream messages 135, downstream messages 145 and acknowledgements 155, and continuously, in real-time, determining and storing a "snapshot" of the current order state of the supported system 140. OOM 100 preferably receives the upstream message data 135 and downstream message data 145 via multicast transmission, ensuring that minimal latency is introduced to the transmission of the messages via the reliable transport 170. The current order state of the supported system 140 may be maintained in real-time by OOM 100, which receives the same upstream messages 135, downstream messages 145 and acknowledgement messages 155 as the supported system 140.

OOM 100 may have sublayers, including Administrative Layer 105, Order Manager Layer 110 and Data Store 115. The Administrative Layer 105 provides administrators with access to monitoring and control functions for the replication and recovery processes. The Order Manager Layer 110 may be used to create or alter order states upon receiving commands to do so. The Data Store 115 provides storage for order states or supported system states based upon the received upstream message data 135 and downstream message data 145.

Figure 1B:
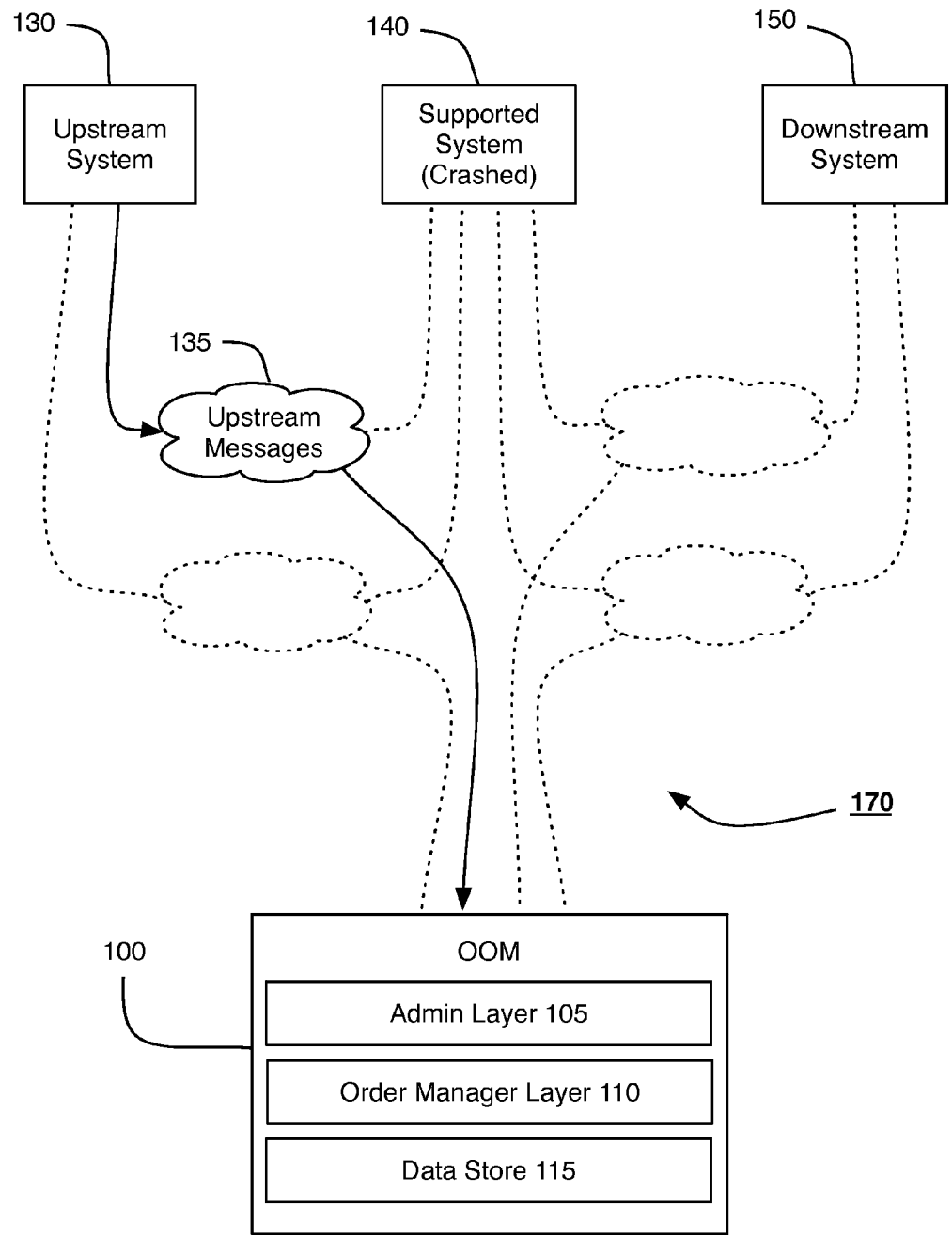

FIG. 1B illustrates the supported system 140, reliable transport 170 and OOM 100 after the supported system 140 has experienced an outage. The supported system 140 is rendered offline, and communication with the upstream server system 130 and downstream server system 150 is broken. However, the reliable transport 170 continues to function and OOM 100 temporarily continues to receive inbound transmissions from the upstream server system 130, as long as the upstream server system 130 continues to transmit upstream messages 135. Once the upstream server system 130 determines that the supported system 140 has gone offline, it stops transmitting messages to the supported system 140.

Figure 1C:
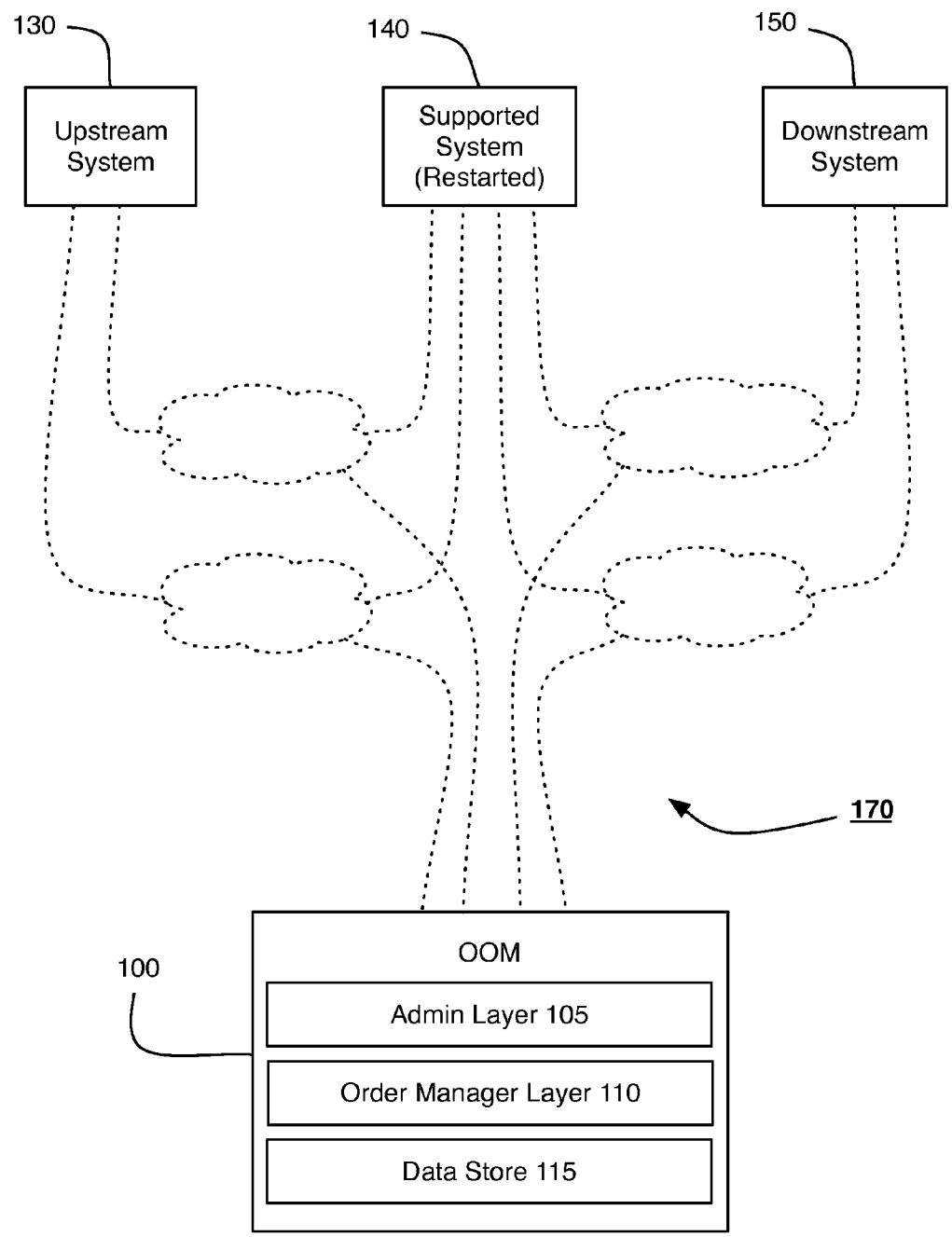

FIG. 1C illustrates the supported system 140, reliable transport 170 and OOM 100 after the supported system 140 has been restarted. Once the supported system 140 has been reinitialized, the supported system 140 and OOM 100 may subscribe to particular recovery channels via the reliable transport 170 to prepare for recovery by transmission of data from OOM 100 to the supported system 140. The supported system 140 may also reestablish a connection to the upstream system 130 for the purpose of acknowledging orders that were pending when the supported system 140 experienced the outage. Both of these connections may be created through the reliable transport 170 via subscription.

Figure 1D:
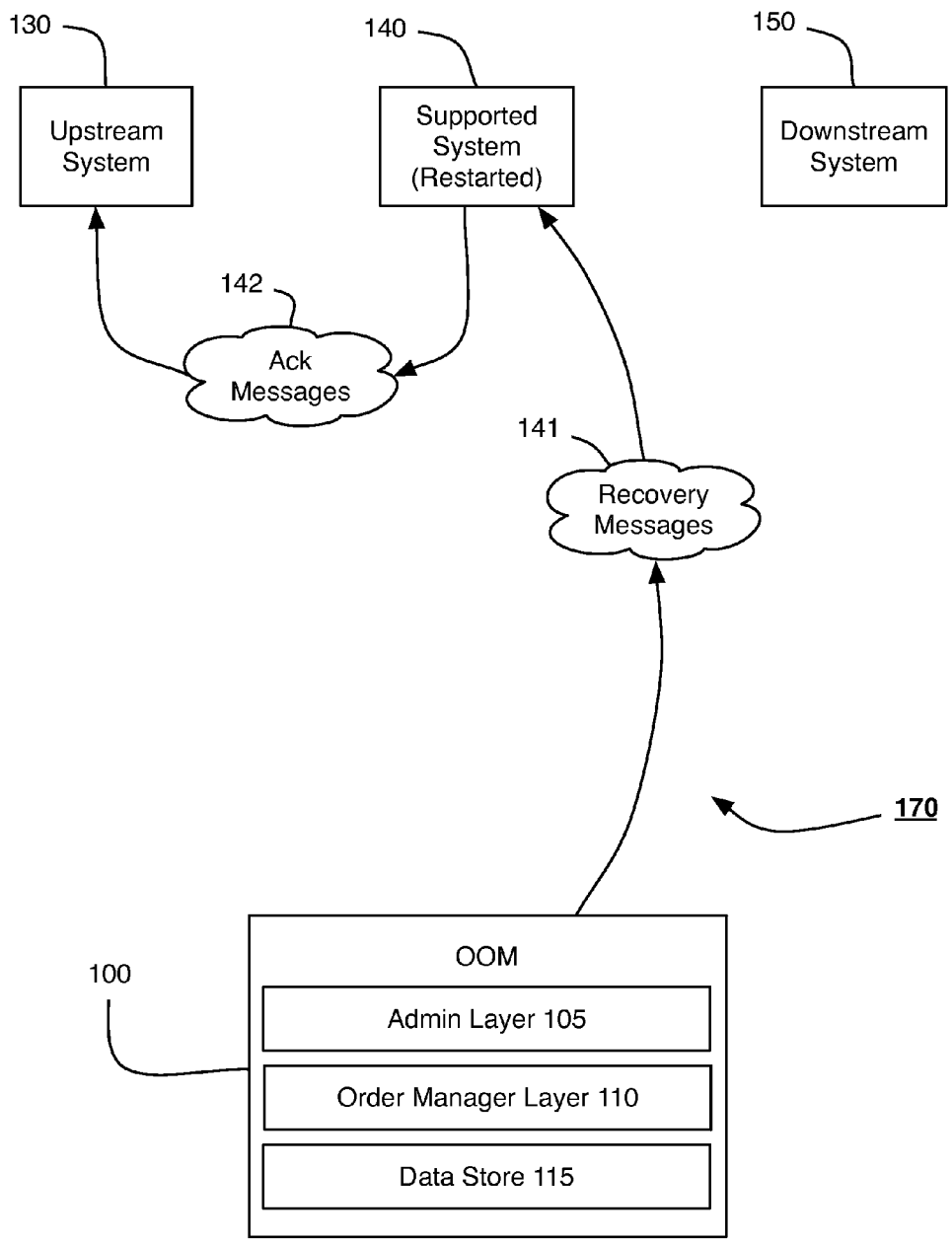
Figure 1E:
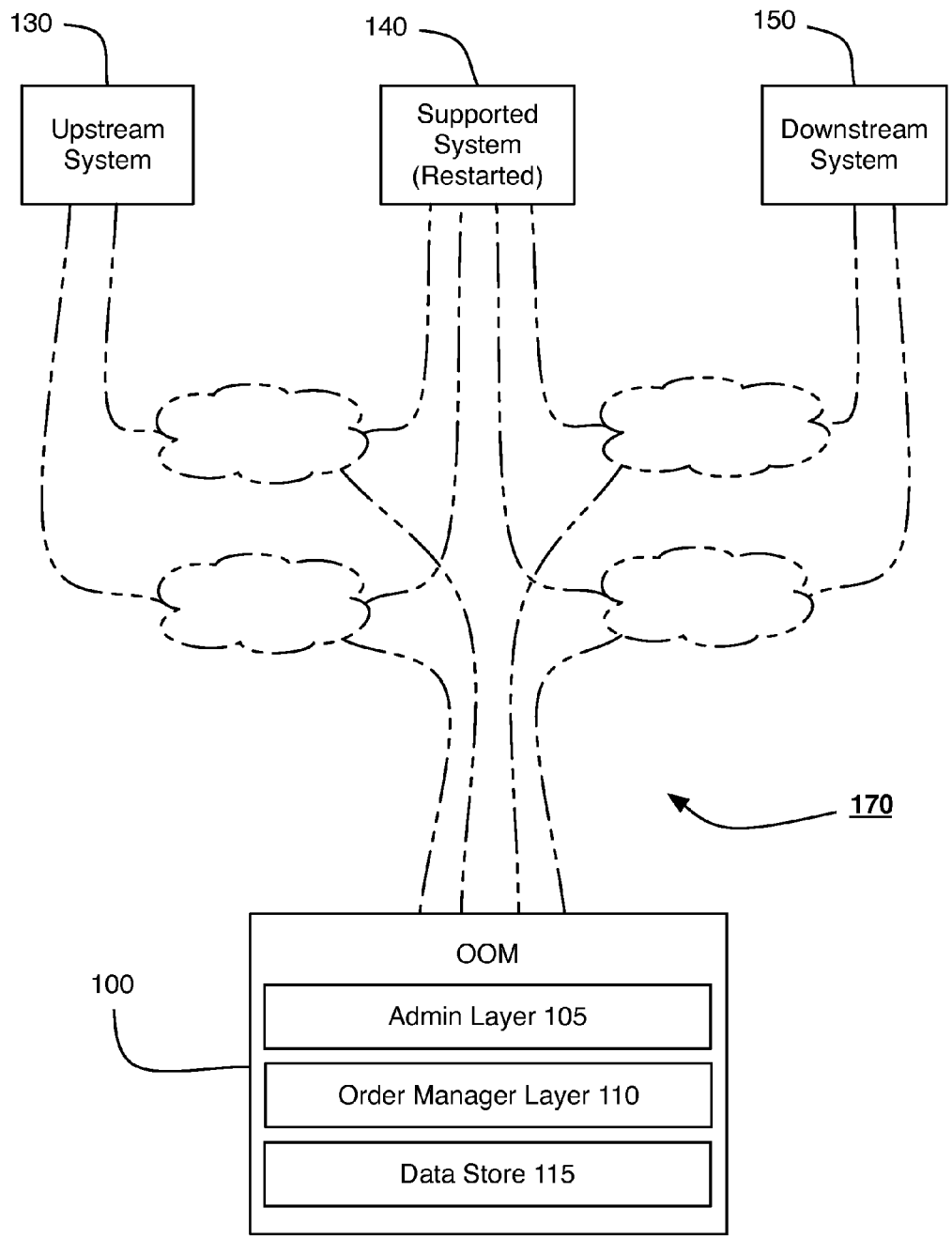

FIG. 1D illustrates the supported system 140, reliable transport 170 and OOM 100 during the recovery process. Once dependencies have been checked and all are ready for recovery, the supported system 140 may receive the relevant recovery messages 141 from OOM 100 necessary to rebuild the order state of the supported system 140 prior to the outage. The recovery message 141 is a snapshot of the current order state of the supported system 140 that is transmitted by OOM 100 over the reliable transport 170 in response to a recovery request from the supported system 140 after it comes back up after the outage. Recovery messages 141 may contain unacknowledged orders at the time the outage occurred. If the supported system 140 receives an unacknowledged order, it may send an acknowledgement message 142 to the upstream system 130 to acknowledge the received message. As will be described below, the different status between these two groups of messages requires different treatment during recovery. When the order state of the supported system 140 has been recovered, then, as depicted in FIG. 1E, the supported system 140 is ready to resume normal operation.

Figure 1F:
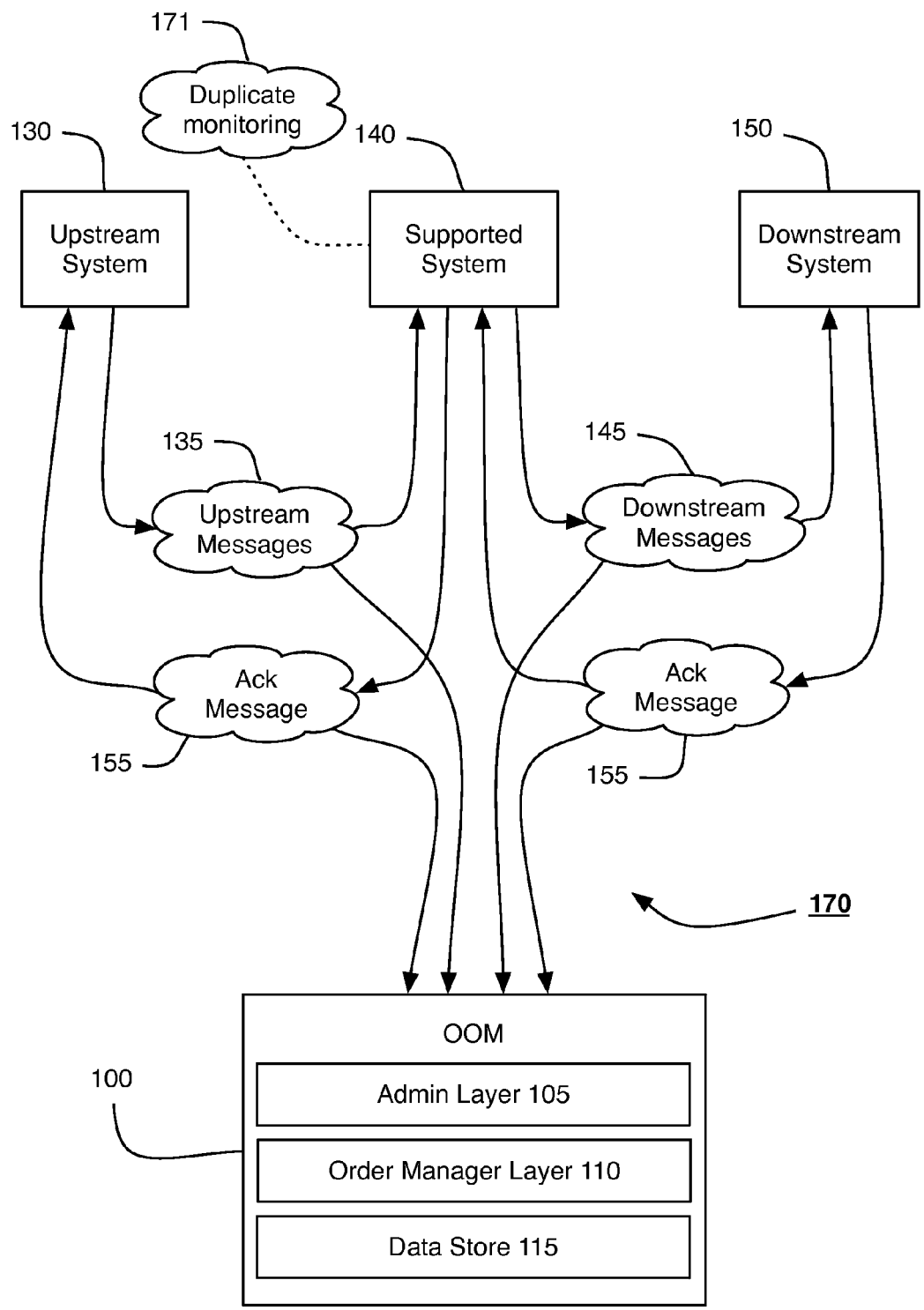

FIG. 1F illustrates the supported system 140 as it begins to resume normal operation. The supported system 140 re-subscribes to the appropriate reliable transport 170 topics to receive upstream message data 135. After sending an indicator to the upstream server 130 that it is prepared to receive new messages, the supported system 140 begins receiving upstream message data 135 from the upstream server 130, and normal operation may resume, as depicted in FIG. 1F.

Figure 2:
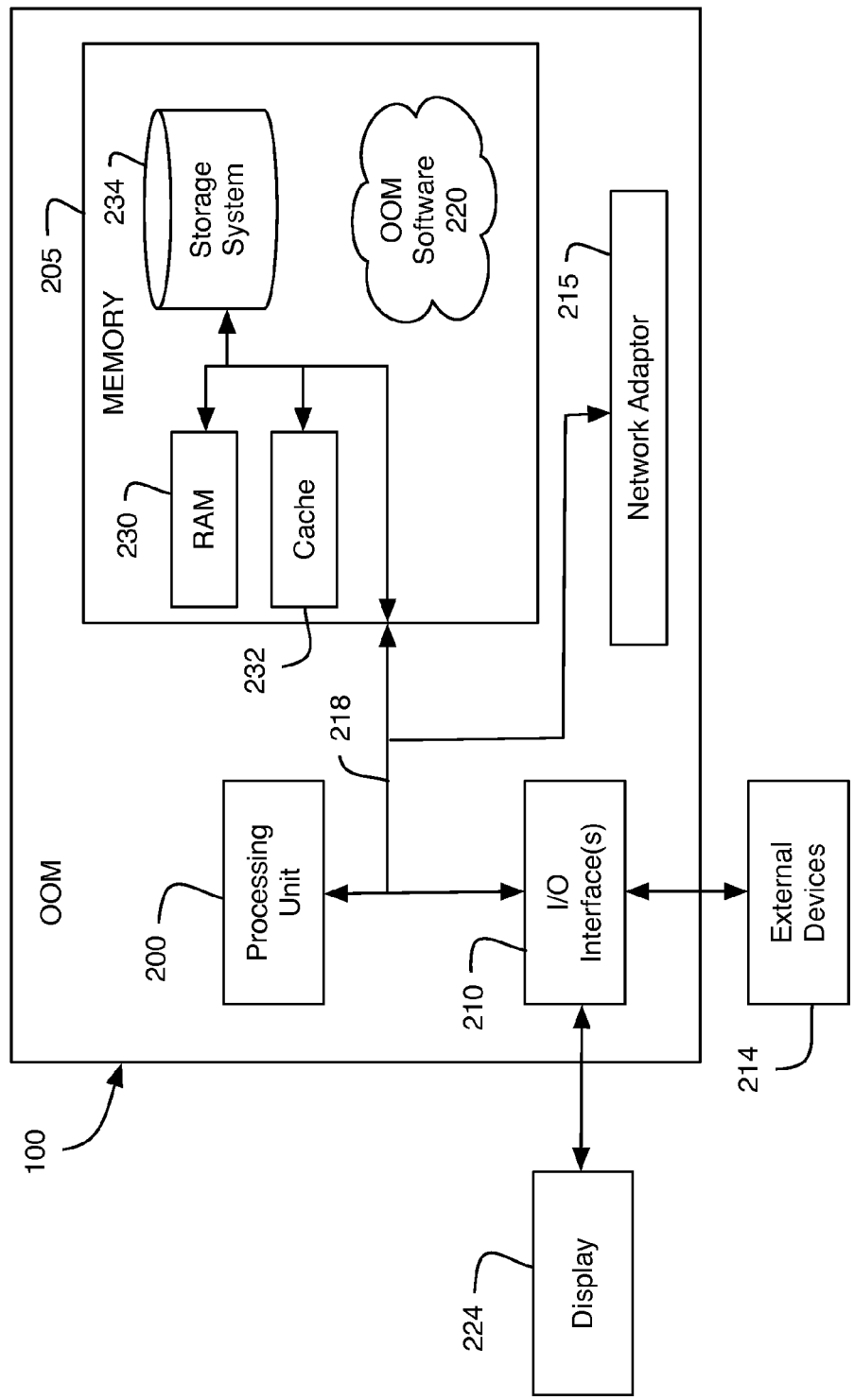
FIG. 2 is a high level representation of an illustrative passive real-time order state replication and recovery system instance.

FIG. 2 is a high level representation of an illustrative passive real-time order state replication and recovery system instance or OOM 100. OOM 100 may be operational with numerous other general purpose or special purpose computing systems, environments or configurations. A single OOM 100 may be implemented utilizing one or more computing systems of varying configurations. For instance, each OOM 100 may be contained within a single computing system (as depicted). Alternatively, multiple OOMs 100 may be operated on a single hardware platform. In other embodiments, a single computer system may house multiple processors, each hosting separate OOMs 100. Any desirable configuration may be utilized as required. Each computing system preferably includes computing components for executing computer program instructions and processes.

As shown in FIG. 2, OOM 100 is illustrated in the form of a special purpose computer system. The components of OOM 100 may include (but are not limited to) one or more processors or processing units 200, a system memory 205, and a bus 218 that couples various system components including memory 205 to processor 200.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The processing unit 200 processes and executes computer program instructions stored in memory 205. Any suitable programming language can be used to implement the routines of particular embodiments including C, C++, Java, assembly language, etc. Different programming techniques can be employed such as procedural or object oriented. The routines can execute on a single OOM 100 or multiple OOMs. Further, multiple processors 200 may be used.

System memory 205 can include computer system readable media in the form of volatile memory, such as random access memory (RAM) 230 and/or cache memory 232. OOM 100 may further include other removable/non-removable, volatile/non-volatile computer system storage media. By way of example only, storage system 234 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 205 may include at least one program product having a set (e.g., at least one) of program modules that are configured to carry out the functions of embodiments described in this disclosure.

OOM software module 220 may be stored in memory 205 by way of example, and not limitation, as well as an operating system, one or more application programs, other program modules, and program data. The OOM software module 220 is executable by processor 200 to generally carry out the functions and/or methodologies of embodiments described herein. In particular, OOM software module 220 may be tasked with receiving and processing upstream and downstream message data 135, 145, thereby maintaining the same order state as the supported system 140.

OOM 100 may also communicate with one or more external devices 214 such as a keyboard, a pointing device, a display 224, etc.; one or more devices that enable a user to interact with OOM 100; and/or any devices (e.g., network card, modem, etc.) that enable OOM 100 to communicate with one or more other computing devices. Such communication can occur via Input/Output (I/O) interface(s) 210.

The network interface device 215 may provide the OOM 100 with access to a network, which may be a wireless or wired connection. The network may be, for example, the Internet, a corporate intranet, or any other computer network through which OOM 100 may connect to or otherwise communicate with other computers and databases, such as (but not limited to) other OOMs 100, the upstream system 130, the downstream system 150, the messaging pipeline or reliable transport 170, and any other computerized systems, networks or databases for specialized information that may be necessary for implementation of the passive real-time order state replication and recovery system and method.

Figure 3:
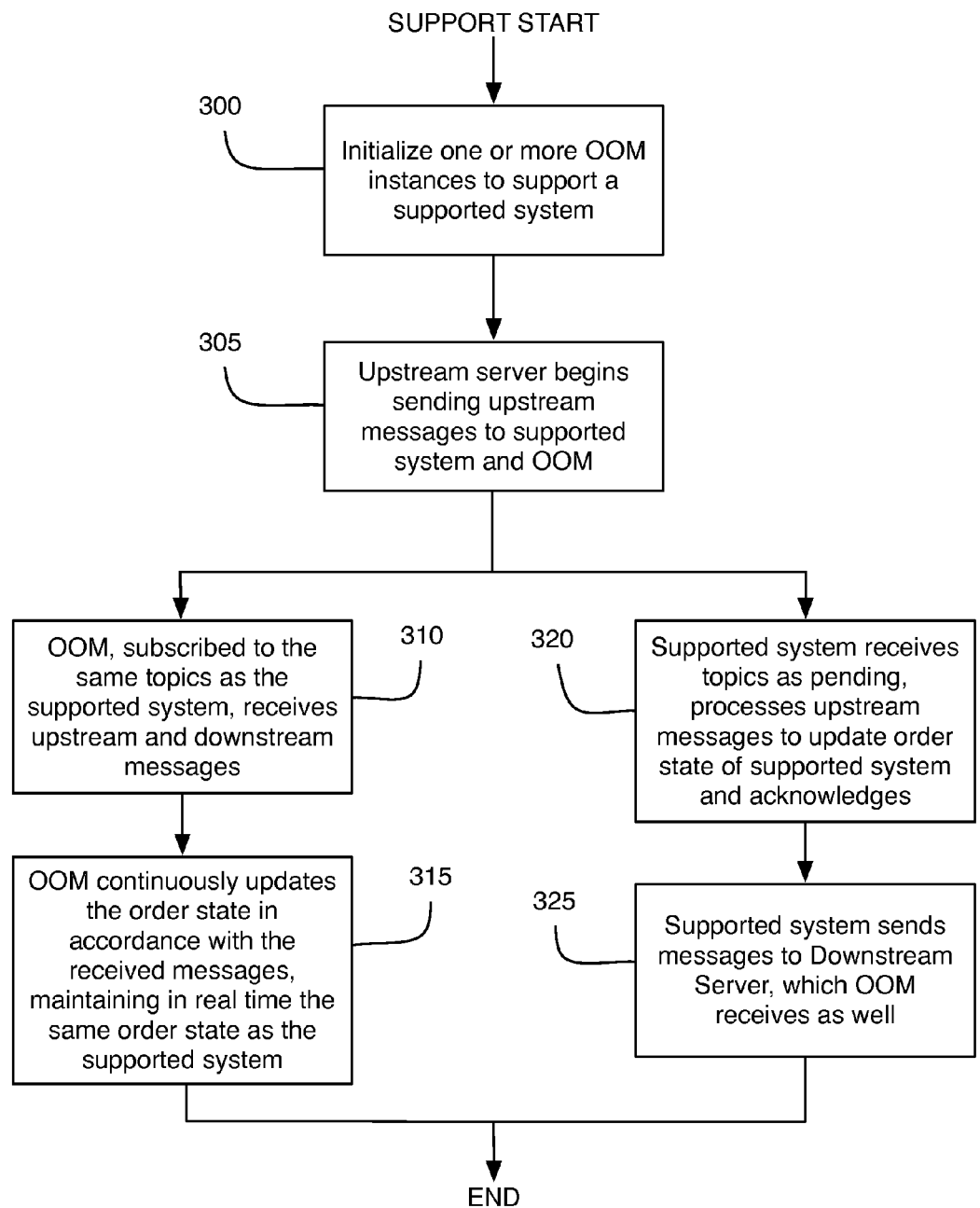
FIG. 3 is an illustrative sequence of steps for passive real-time order state replication.

FIG. 3 is an illustrative sequence of steps for passive real-time order state replication. One or more OOM instances 100 may be initialized to provide order state support for the supported system 140 (step 300). Once all systems are ready, the upstream server 130 may begin sending upstream messages 135 to the supported system 140 and OOM 100 using the reliable transport 170 (steps 305, 310). The supported system 140 receives and processes the upstream messages 135 to update the order state of the supported system, and upon processing, sends an acknowledgement 155 to the upstream system 130 and OOM 100 (step 320). The supported system 140 may also need to output downstream messages 145 in response to received upstream messages 135. Therefore, a downstream message 145 may be sent to a downstream server 150 via the reliable transport 170, which OOM 100 receives as well (step 325). The OOM instances 100, subscribed to the same topics as the supported system 140, receive and process the upstream messages 135 and downstream messages 145 via reliable transport 170 (step 310). Each OOM instance 100 continuously updates its own order state in accordance with the received upstream messages 135, downstream messages 145 and acknowledgements 155, maintaining in real-time the same order state as the supported system 140 (step 315).

Figure 4:
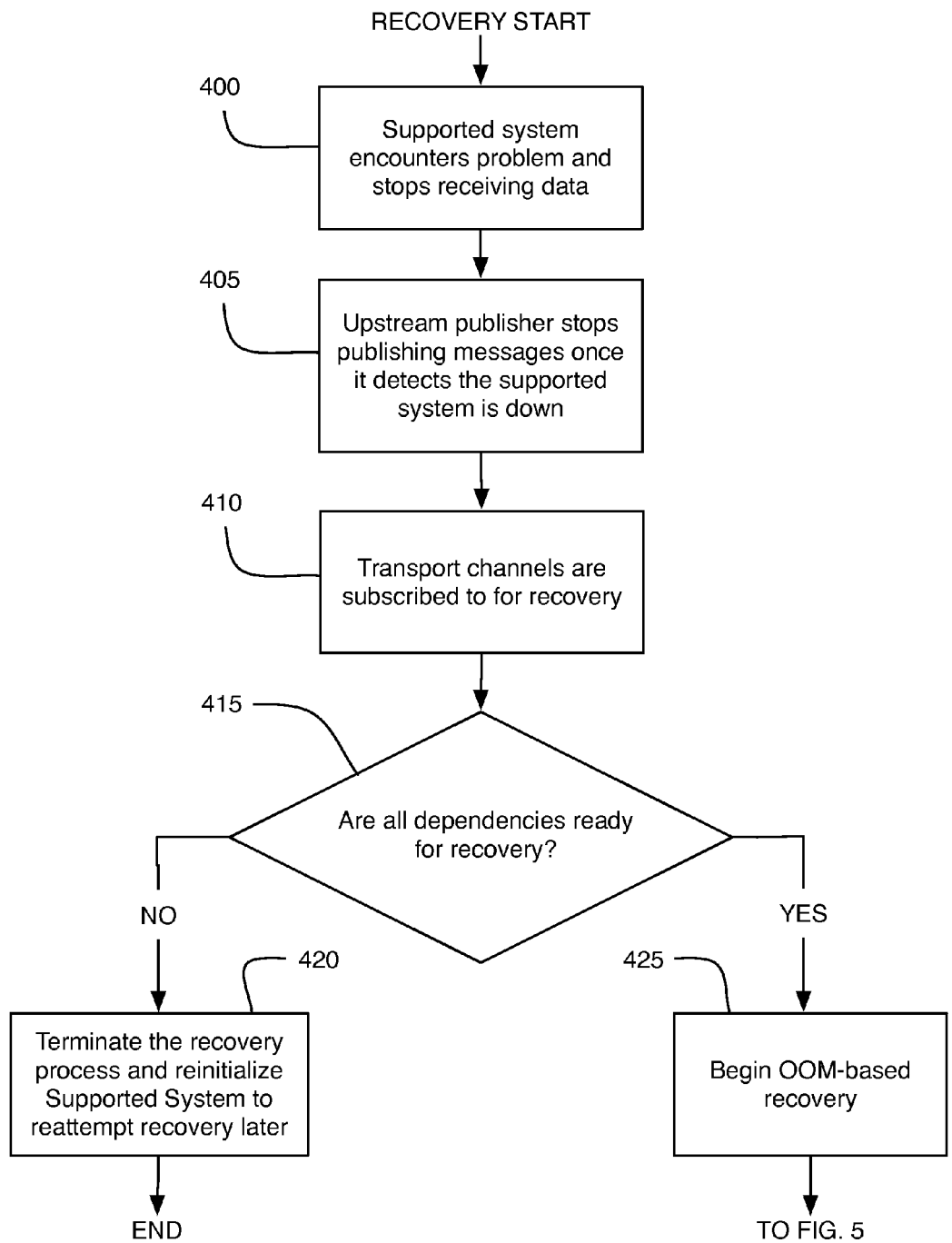
FIG. 4 is an illustrative sequence of steps for real-time order state recovery.
Figure 5:
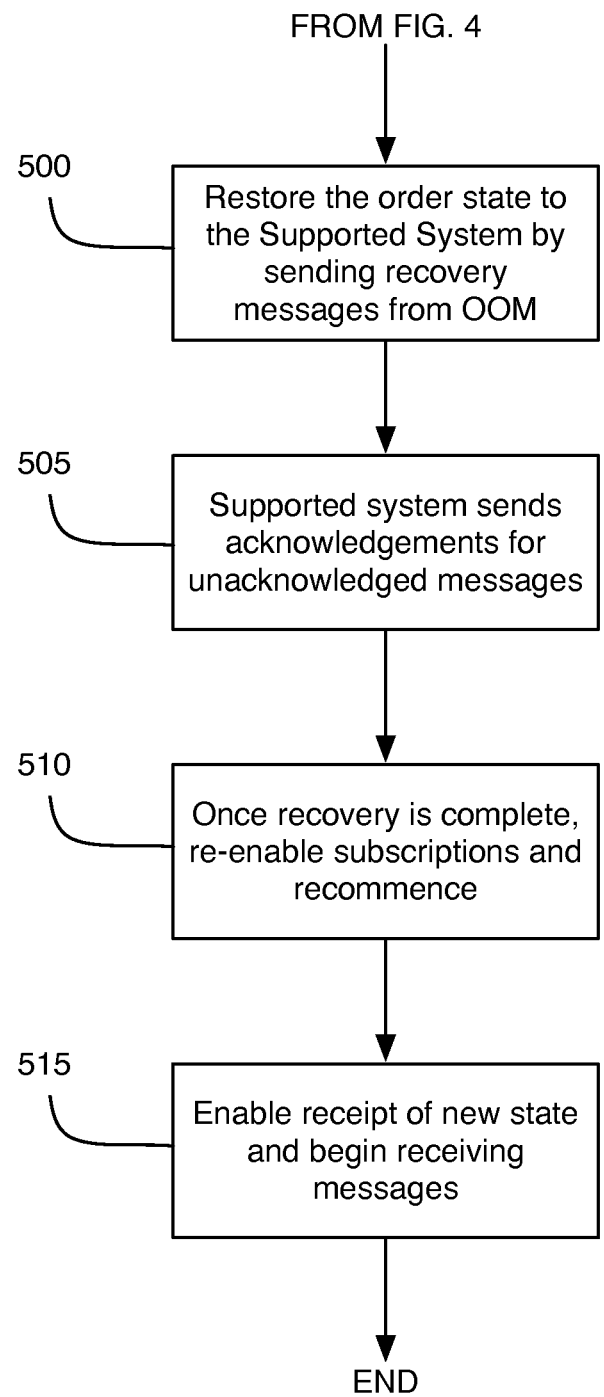
FIG. 5 is a continuing illustrative sequence of steps for real-time order state recovery.

FIGS. 4-5 illustrate a preferred sequence of steps for real-time order state recovery. Referring to FIG. 4, the supported system 140 may experience an outage, and stops receiving upstream messages 135 and sending downstream messages 145 (step 400). At the time the outage occurred, any number of upstream messages 135 may have gone unacknowledged by the supported system 140. These "pending" upstream messages 135 will need to be acknowledged during the recovery process. The upstream system 130 may cease sending upstream messages 135 to the supported system 140 and OOM 100 when it detects the supported system 140 is offline (step 405). The reliable transport 170 may have a built-in heartbeat-based mechanism to detect the connected or disconnected status of the supported system 140.

The supported system 140 may re-initialize, and both the supported system 140 and OOM 100 subscribe to appropriate topics via the reliable transport 170 for the purpose of sending and receiving recovery messages 141 and acknowledgements 142 (step 410). Subsequently, it is determined whether all dependencies are ready for recovery (step 415). That is, whether the system and infrastructure necessary for recovery (e.g., OOM 100, supported system 140, upstream server 130, reliable transport 170, etc.) are ready for recovery. If one of the dependencies is not ready for recovery, then the initialization of the supported system 140 is terminated and later restarted to retry recovery (step 420). If all dependencies are ready, recovery via OOM 100 is initiated (step 425).

Referring now to FIG. 5, the order state of the supported system 140 is restored by sending the relevant recovery messages 141 from OOM 100 to the supported system 140 (step 500). The recovery messages 141 contain the order states, which are based on messages 135, 145 and 155 received by OOM 100, to duplicate the order state of the supported system 140. During recovery, the supported system 140 may send acknowledgements 142 for messages 135 that were unacknowledged but already received (e.g., unacknowledged orders) (step 505). This information is included inherently in OOM 100, because it receives acknowledgement messages 155, in addition to upstream messages 135 and downstream messages 145. Therefore, messages received by OOM 100 that do not have a corresponding acknowledgement message 155 (e.g., unacknowledged orders) will require transmission of an acknowledgement 142. Once the order state of the supported system 140 has been restored, the appropriate subscriptions may be created using the reliable transport 170 (step 510), and standard operation may be resumed by enabling the receipt of new order state information, allowing the supported system 140 to receive and send messages and acknowledgements (step 515).

FIG. 6 illustrates some nuances of the recovery phase. Messages may take a variety of forms, including pending "new" messages, "replacement" messages and "cancellation" messages. Pending new messages are messages that have been received previously but have gone unacknowledged (presumably because the outage occurred before they could be processed). Pending replacement messages are messages that are meant to replace another message already extant within the supported system 140. Pending cancellation messages are messages that are sent to cancel an extant message within the supported system 140. Each message may be a combination of these forms of messages, and accordingly, must be handled differently in order to accurately rebuild the order state of the supported system 140 prior to the outage.

First phase recoveries are illustrated in scenarios 600-615. All first phase recovery messages are already acknowledged, meaning they are not "new" messages, as indicated by the "false" markers in column 640. Scenarios 600-615 are therefore the messages that are recovered during the first phase. Scenario 600 summarizes messages that are neither new, pending replacement nor pending cancellation. These messages are recovered normally and require no additional steps. Scenario 605 summarizes messages that are not new or pending replacement, but are pending cancellations. These messages are therefore recovered normally, but during the second phase, a special cancellation acknowledgement 155 is sent from support system 140 to the upstream system 130, as would have been performed normally if the outage had not occurred. Scenario 610 summarizes messages that are not new or pending cancellation, but are pending replacement. These messages are recovered normally, but during the second phase, the replacement is attempted. Subsequently, either a successful acknowledgement 155 or a rejection acknowledgement 155 is sent by the supported system 140 depending on whether the replacement attempt was successful. Scenario 615 summarizes messages that are not new, but are pending replacement and pending cancellation. These messages are recovered normally during the first phase, but during the second phase, the replacement and cancellation actions are attempted. The supported system 140 may then send two sets of acknowledgements 155, the first indicating whether the replacement attempt was successful, and the second indicating whether the cancellation attempt was successful.

Second phase recoveries are illustrated in scenarios 620-635. All second phase recovery messages were pending but not yet processed when the outage occurred, and therefore remain unacknowledged. Scenario 620 summarizes pending "new" messages that are not pending replacement or pending cancellation. These messages are received by the supported system 140 as simple new messages, processed by the supported system, and an acknowledgement 155 is sent to the upstream system 130. Scenario 625 summarizes pending "new" messages that are not pending replacement, but are pending cancellation. These messages are received by the supported system 140 and an acknowledgement 155 is sent in response. Subsequently, the cancellation is attempted, and a second acknowledgement 155 is sent indicating whether the cancellation was successful or unsuccessful. Scenario 630 summarizes pending "new" messages that are pending replacement, but are not pending cancellation. These messages are received by the supported system 140 and an acknowledgement 155 is sent in response. Subsequently, the replacement is attempted and another acknowledgement 155 is sent indicating whether the replacement was successful or unsuccessful. Scenario 635 summarizes pending "new" messages that are pending replacement and pending cancellation. These messages are received by the supported system 140 and an acknowledgement 155 is sent in response. Subsequently, the replacement and cancellation are attempted, and two acknowledgements 155 may be sent, one indicating whether the replacement was successful or unsuccessful, and the other indicating whether the cancellation was successful or unsuccessful.

Figure 7A:
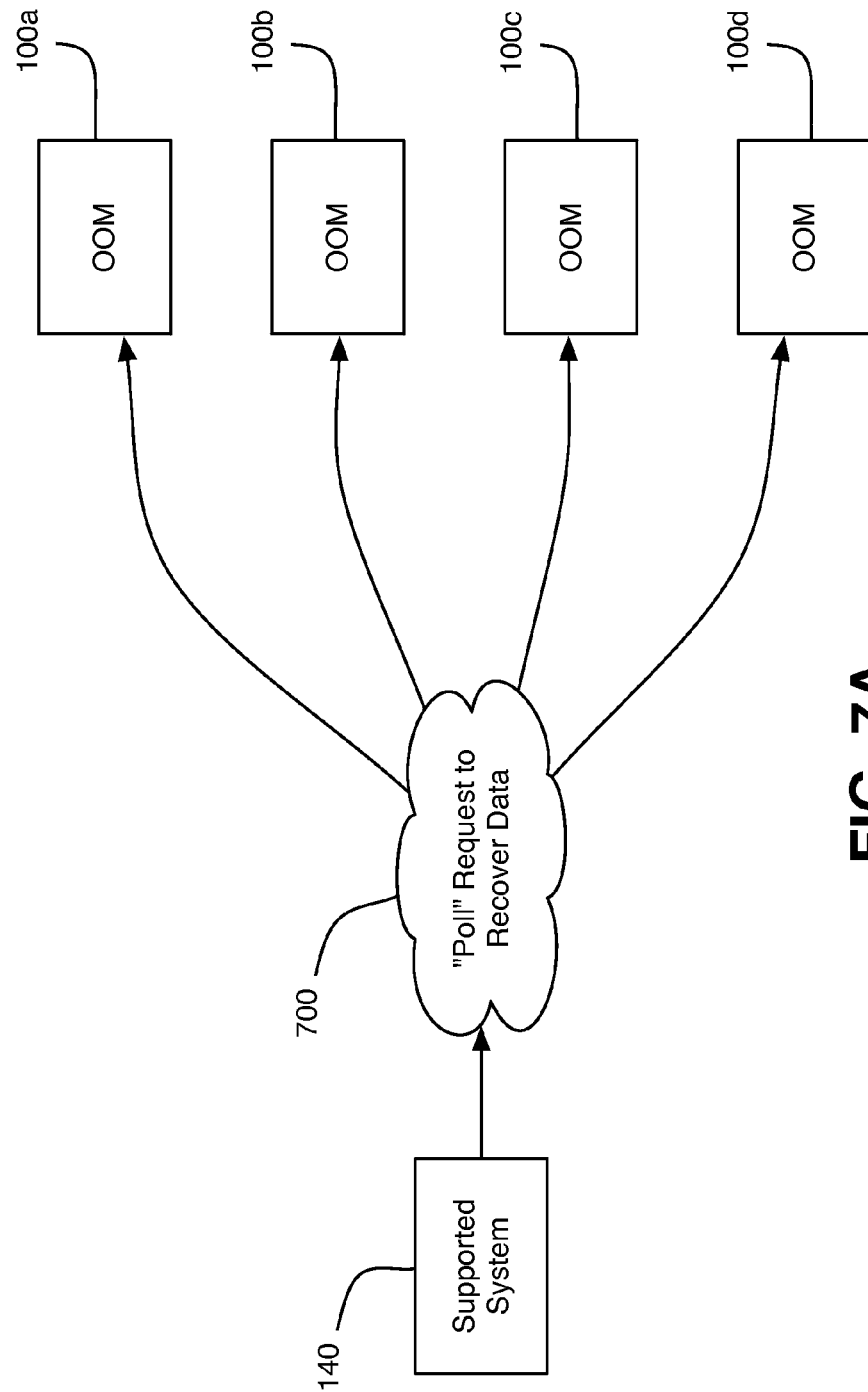
FIGS. 7A-7D are high level representations of a supported system utilizing multiple illustrative passive real-time order state replication and recovery systems.
Figure 7B:
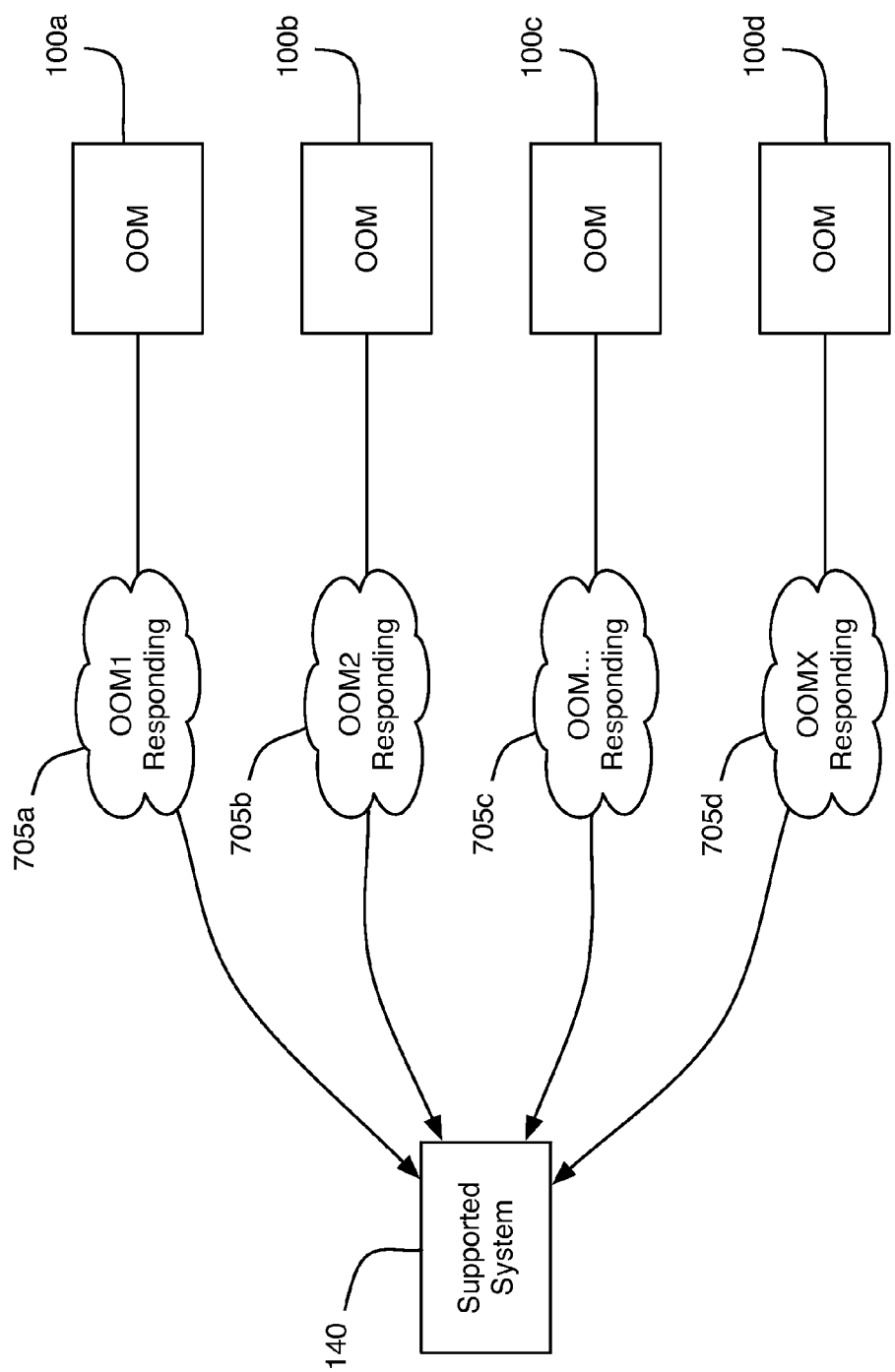
Figure 7C:
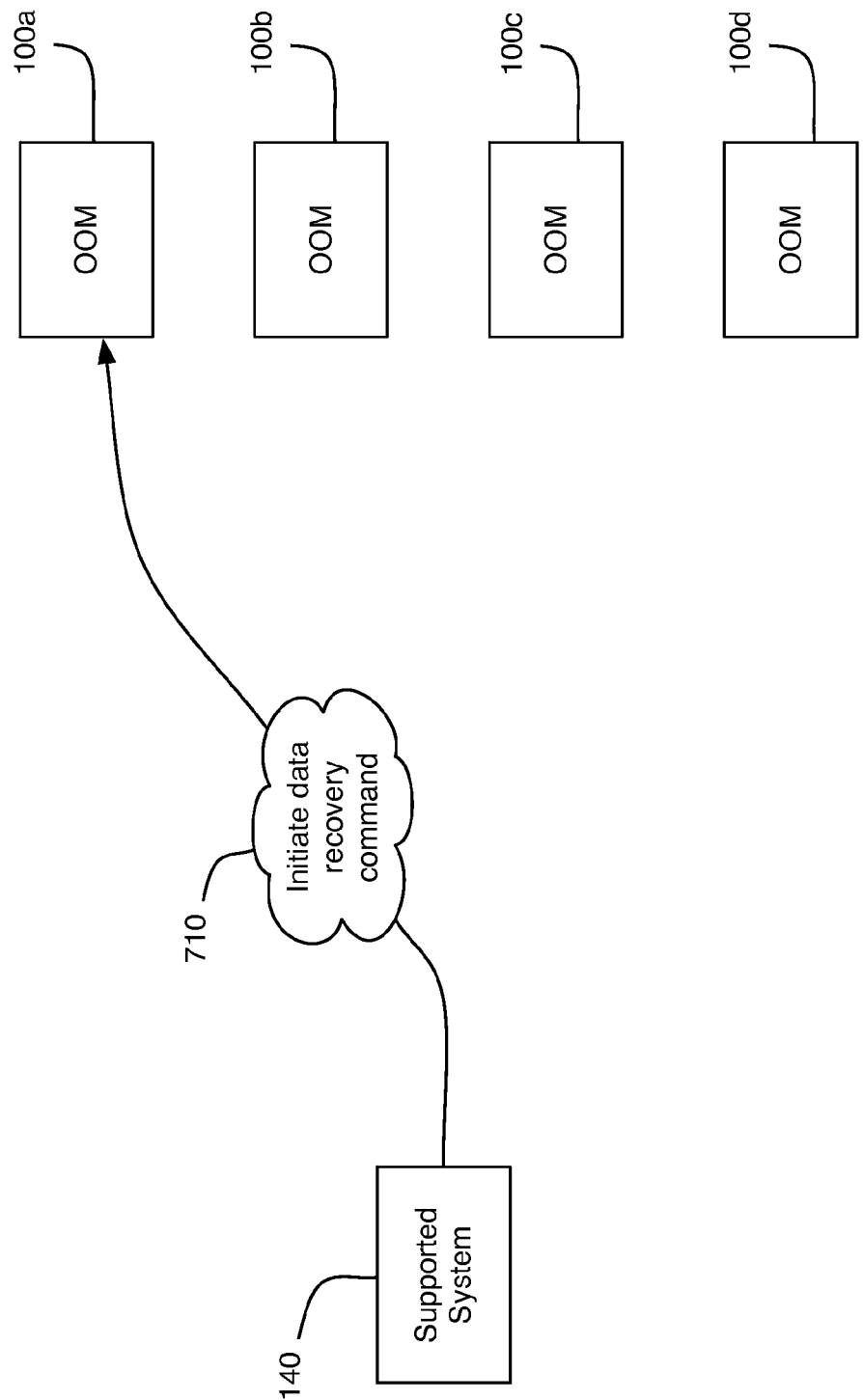
Figure 7D:
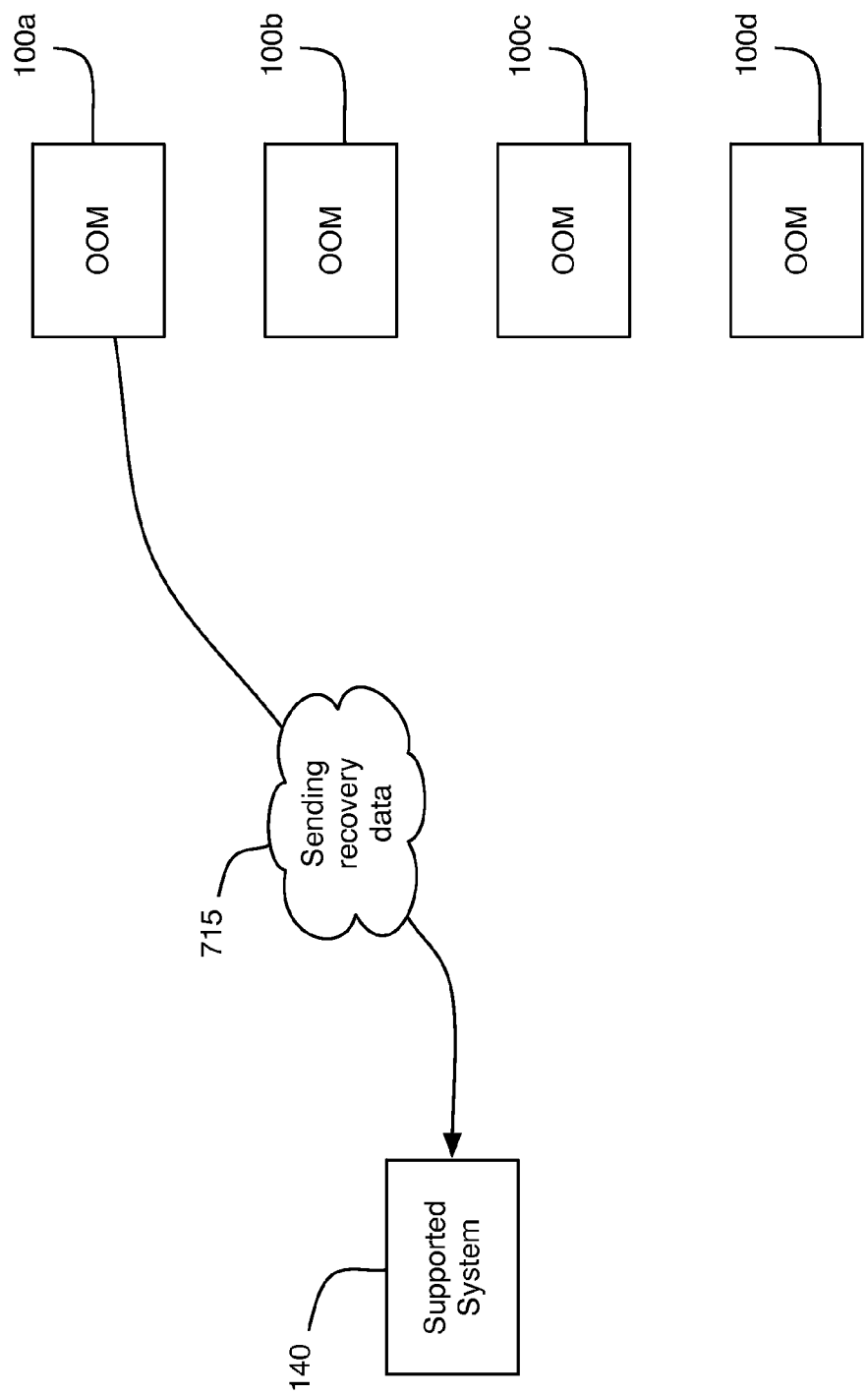

FIGS. 7A-7D are high level representations of a supported system 140 utilizing multiple OOMs 100a-100d. Multiple OOMs 100a-100d may be used in conjunction to provide any desired benefit, such as redundancy or more specialized support. The supported system 140 may select an OOM instance 100a-100d to recover from based on the following process. Referring to FIG. 7A, after the supported system 140 has experienced an outage and upon recovery, the supported system 140 sends a "poll" request 700 to recover lost data to all OOM instances 100a-100d. Referring to FIG. 7B, when each OOM instance 100a-100d receives the "poll" request, each OOM instance 100a-100d sends a response 705a-705d to the supported system 140. The responses 705a-705d may have varying travel times to reach to the supported system 140, based on the network topography. As a result, some may be received before others. Referring to FIG. 7C, the supported system 140 sends a command to initiate data recovery 710 to, for example, OOM instance 100a, because the response from OOM instance 100a happened to be received first by the supported system 140. Finally, referring to FIG. 7D, OOM instance 100a begins sending recovery data 715 to the supported system 140. Recovery then proceeds as described above.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer implemented method for passive real-time order state replication and recovery, comprising:
    receiving, using a computer processor outside a trading network, upstream data sent within the trading network from an upstream system via a reliable transport to a supported system in parallel with transit of the upstream data to the supported system;
    receiving, using the computer processor, downstream data directed to a downstream system within the trading network from the supported system, the downstream data being received via the reliable transport in parallel with transit of the downstream data to the downstream system;
    receiving, using the computer processor, data acknowledgements, sent from the supported system to the upstream system and from the downstream system to the supported system, respectively acknowledging receipt of the upstream and downstream data, the data acknowledgements being received in parallel with the receipt by the upstream system and the supported system;
    for each order transiting the supported system between the upstream system and the downstream system, continuously updating in real-time, using the computer processor, a replicated current order state based on the upstream data, downstream data and the data acknowledgements received at the supported system, the replicated current order state for orders comprising one of: initial, acknowledgement order is being processed, fill or kill, immediate, cancelled, good for day, or closed;
    receiving, using the computer processor, a recovery request after the supported system has experienced an outage; and
    restoring the current order state to the supported system by transmitting a recovery message to the supported system containing the replicated current order state.

2. The method of claim 1, wherein, following the restoring, the supported system transmits data acknowledgements to the upstream system for any received upstream data where a data acknowledgement was not transmitted by the supported system before the outage occurred.

3. The method of claim 1, further comprising, following restoring the current order state to the supported system using the replicated current order state as of the outage:
    determining, using the computer processor, that new data comprising the received upstream messages and the received downstream messages were unacknowledged when the outage was experienced based on the received upstream and downstream data acknowledgements; and
    determining, using the computer processor, that old data comprising the received upstream messages and the received downstream messages were acknowledged when the outage was experienced based on the received upstream and downstream data acknowledgements.

4. The method of claim 3, wherein the old data that was acknowledged by the supported system at the time the outage occurred is processed in a first phase, and the new data comprising data that was unacknowledged by the supported system at the time the outage occurred is processed in a second phase.

5. The method of claim 4, further comprising:
    processing old data that is not pending replacement and not pending cancellation by normal insertion into the supported system.

6. The method of claim 4, further comprising:
    processing old data that is not pending replacement and is pending cancellation by normal insertion into the supported system during the first phase; and
    sending a cancellation acknowledgement during the second phase.

7. The method of claim 4, further comprising:
    processing old data that is pending replacement and is not pending cancellation by normal insertion into the supported system during the first phase;
    attempting replacement during the second phase; and
    sending a replacement acknowledgement during the second phase indicating whether replacement was successful or non-successful.

8. The method of claim 4, further comprising:
    processing old data that is pending replacement and is pending cancellation by normal insertion into the supported system during the first phase;
    attempting replacement during the second phase;
    sending a replacement acknowledgement during the second phase indicating whether replacement was successful or non-successful; and
    sending a cancellation acknowledgement.

9. The method of claim 4, further comprising:
    processing new data that is not pending replacement and is not pending cancellation by attempted insertion into the supported system as a new data entry during the second phase; and
    sending an acknowledgement if the insertion was successful.

10. The method of claim 4, further comprising:
    processing new data that is not pending replacement and is pending cancellation by attempted insertion into the supported system as a new data entry during the second phase;
    sending an acknowledgement if the insertion was successful; and
    sending a cancellation acknowledgement.

11. The method of claim 4, further comprising:
    processing new data that is pending replacement and is not pending cancellation by attempted insertion into the supported system as a new data entry during the second phase;
    sending an acknowledgement if the insertion was successful;
    attempting replacement during the second phase; and
    sending a replacement acknowledgement indicating whether the replacement was successful or non-successful.

12. The method of claim 4, further comprising:
    processing new data that is pending replacement and is pending cancellation by attempted insertion into the supported system as a new data entry during the second phase;

sending an acknowledgement if the insertion was successful;

attempting replacement during the second phase;

sending a replacement acknowledgement indicating whether the replacement was successful or non-successful; and sending a cancellation acknowledgement.

13. A passive real-time order state replication and recovery system for use with a trading network, comprising:

a computer processor that is not part of the trading network;

computer memory comprising program instructions, the program instructions executable by the processor to:

receive at the computer processor, upstream data sent from an upstream system to a supported system within the trading network, the upstream data being received via a reliable transport in parallel with the upstream data transiting to the supported system;

receive at the computer processor, downstream data sent within the trading network from the supported system to a downstream system, the downstream data being received via the reliable transport in parallel with the downstream data transiting to the downstream system;

receive data acknowledgements, sent from the supported system to the upstream system and from the downstream system to the supported system, respectively acknowledging receipt of the upstream and downstream data, the data acknowledgements being received in parallel with receipt by the upstream system and the supported system;

for each order transiting the supported system between the upstream system and the downstream system, continuously update in real-time a replicated current order state based on the upstream data, downstream data and the data acknowledgements received at the supported system, the replicated current order state for orders comprising one of: initial, acknowledgement order is being processed, fill or kill, immediate, cancelled, good for day, or closed;

receive a recovery request after the supported system has experienced an outage; and restore the current order state to the supported system by transmitting a recovery message to the supported system containing the replicated current order state.

14. The system of claim 13, wherein, following the restoring the current order state to the supported system using the replicated current order state as of the outage, the supported system transmits data acknowledgements to the upstream system for any received upstream data where a data acknowledgement was not transmitted by the supported system before the outage occurred.

15. The system of claim 13, wherein the program instructions are further executed by the processor to, following the restoring the current order state to the supported system using the replicated current order state as of the outage:

determine that new data comprising the received upstream messages and the received downstream messages were unacknowledged when the outage was experienced based on the received upstream and downstream data acknowledgements; and determine that old data comprising the received upstream messages and the received downstream messages were acknowledged when the outage was experienced based on the received upstream and downstream data acknowledgements.

16. The system of claim 15, wherein the old data that was acknowledged by the supported system at the time the outage occurred is processed in a first phase, and the new data comprising data that was unacknowledged by the supported system at the time the outage occurred is processed in a second phase.

17. The system of claim 16, wherein the program instructions are further executed by the processor to:

process old data that is not pending replacement and not pending cancellation by normal insertion into the supported system.

18. The system of claim 16, wherein the program instructions are further executed by the processor to:

process old data that is not pending replacement and is pending cancellation by normal insertion into the supported system during the first phase; and send a cancellation acknowledgement during the second phase.

19. The system of claim 16, wherein the program instructions are further executed by the processor to:

process old data that is pending replacement and is not pending cancellation by normal insertion into the supported system during the first phase;

attempt replacement during the second phase; and send a replacement acknowledgement during the second phase indicating whether replacement was successful or non-successful.

20. The system of claim 16, wherein the program instructions are further executed by the processor to:

process old data that is pending replacement and is pending cancellation by normal insertion into the supported system during the first phase;

attempt replacement during the second phase;

send a replacement acknowledgement during the second phase indicating whether replacement was successful or non-successful; and send a cancellation acknowledgement.

21. The system of claim 16, wherein the program instructions are further executed by the processor to:

process new data that is not pending replacement and is not pending cancellation by attempted insertion into the supported system as a new data entry during the second phase; and send an acknowledgement if the insertion was successful.

22. The system of claim 16, wherein the program instructions are further executed by the processor to:

process new data that is not pending replacement and is pending cancellation by attempted insertion into the supported system as a new data entry during the second phase;

send an acknowledgement if the insertion was successful; and send a cancellation acknowledgement.

23. The system of claim 16, wherein the program instructions are further executed by the processor to:

process new data that is pending replacement and is not pending cancellation by attempted insertion into the supported system as a new data entry during the second phase;

send an acknowledgement if the insertion was successful;

attempt replacement during the second phase; and send a replacement acknowledgement indicating whether the replacement was successful or non-successful.

24. The system of claim 16, wherein the program instructions are further executed by the processor to:
- process new data that is pending replacement and is pending cancellation by attempted insertion into the supported system as a new data entry during the second phase;
- send an acknowledgement if the insertion was successful;
- attempt replacement during the second phase;
- send a replacement acknowledgement indicating whether the replacement was successful or non-successful; and
- send a cancellation acknowledgement.

* * * * *